(12) United States Patent
Yoder et al.

(10) Patent No.: US 9,080,763 B2
(45) Date of Patent: Jul. 14, 2015

(54) EDGE LIT LUMINAIRES FOR WINDOWS

(75) Inventors: Benjamin Lee Yoder, Cleveland Heights, OH (US); Thomas Alexander Knapp, Cleveland, OH (US)

(73) Assignee: GE LIGHTING SOLUTIONS, LLC, Cleveland, OH (US)

( * ) Notice: Subject to any disclaimer, the term of this patent is extended or adjusted under 35 U.S.C. 154(b) by 142 days.

(21) Appl. No.: 13/473,636

(22) Filed: May 17, 2012

(65) Prior Publication Data

US 2013/0307420 A1    Nov. 21, 2013

(51) Int. Cl.
| | |
|---|---|
| H05B 37/02 | (2006.01) |
| F21V 33/00 | (2006.01) |
| F21S 8/02 | (2006.01) |
| F21V 17/02 | (2006.01) |
| F21V 8/00 | (2006.01) |
| F21S 19/00 | (2006.01) |
| F21V 14/04 | (2006.01) |
| F21V 23/04 | (2006.01) |
| F21Y 101/02 | (2006.01) |
| F21Y 113/00 | (2006.01) |
| E06B 3/663 | (2006.01) |
| E04D 13/03 | (2006.01) |
| F21V 29/89 | (2015.01) |

(52) U.S. Cl.
CPC .............. *F21V 33/006* (2013.01); *F21S 8/024* (2013.01); *F21V 17/02* (2013.01); *G02B 6/0095* (2013.01); *E04D 13/03* (2013.01); *E06B 3/66376* (2013.01); *F21S 19/005* (2013.01); *F21V 14/04* (2013.01); *F21V 23/04* (2013.01); *F21V 23/0464* (2013.01); *F21V 29/89* (2015.01); *F21Y 2101/02* (2013.01); *F21Y 2113/005* (2013.01)

(58) Field of Classification Search
None
See application file for complete search history.

(56) References Cited

U.S. PATENT DOCUMENTS

| | | | |
|---|---|---|---|
| 4,114,186 | A | 9/1978 | Dominguez |
| 5,285,356 | A | 2/1994 | Skene et al. |
| 5,528,471 | A | 6/1996 | Green |
| 5,715,636 | A | 2/1998 | Taylor |
| 6,142,645 | A | 11/2000 | Han |
| 6,331,111 | B1 * | 12/2001 | Cao ................................ 433/29 |

(Continued)

FOREIGN PATENT DOCUMENTS

| | | |
|---|---|---|
| CA | 2083998 C | 11/1992 |
| CA | 2528970 A1 | 6/2004 |

(Continued)

OTHER PUBLICATIONS

PCT Search Report and Written Opinion dated Jul. 29, 2013 from corresponding Application No. PCT/US2013/037517.

*Primary Examiner* — Crystal L Hammond
(74) *Attorney, Agent, or Firm* — GE Global Patent Operation; Peter T. DiMauro

(57) ABSTRACT

A luminaire is provided that is configured as a window having a light guide with one or more light sources coupled to one or more edges of the light guide. Light emitted from the light guide can be used e.g., to supplement natural light passing through the window or to provide illumination when natural light is not available. Because the light source (or light sources) is incorporated into the window along one or more edges of the light guide, the light source can be either partially or totally concealed from view so as to create an appearance that can have aesthetic advantages. For example, exemplary embodiments of the present invention can have an appearance that is the same or similar to a conventional window/skylight.

17 Claims, 11 Drawing Sheets

(56) References Cited

U.S. PATENT DOCUMENTS

| | | |
|---|---|---|
| 7,057,821 B2 | 6/2006 | Zincone |
| 7,130,101 B2 | 10/2006 | Rukavina et al. |
| 7,374,315 B2 | 5/2008 | Dorsey et al. |
| 7,481,550 B1 | 1/2009 | Schreiber et al. |
| 7,652,812 B2 | 1/2010 | Mahe et al. |
| 7,736,014 B2 | 6/2010 | Blomberg |
| 7,868,128 B2 | 1/2011 | Crawford et al. |
| 7,976,189 B2 | 7/2011 | Osborn |
| 2002/0060283 A1 | 5/2002 | Jordan et al. |
| 2004/0050380 A1 | 3/2004 | Abe et al. |
| 2005/0116667 A1 | 6/2005 | Mueller et al. |
| 2005/0201075 A1 | 9/2005 | Gandhi |
| 2005/0201087 A1 | 9/2005 | Ward |
| 2006/0007549 A1* | 1/2006 | Zincome ............ 359/591 |
| 2007/0177391 A1 | 8/2007 | Davis et al. |
| 2007/0185675 A1 | 8/2007 | Papmichael et al. |
| 2007/0211446 A1 | 9/2007 | Veskovic |
| 2009/0085497 A1 | 4/2009 | Osborn |
| 2010/0010365 A1 | 1/2010 | Terao et al. |
| 2010/0067228 A1 | 3/2010 | Hente et al. |
| 2010/0103655 A1 | 4/2010 | Smith |
| 2010/0118521 A1 | 5/2010 | Jacobs |
| 2010/0212238 A1 | 8/2010 | Voegele, Jr. et al. |
| 2011/0240232 A1 | 10/2011 | Kluck |
| 2012/0314449 A1* | 12/2012 | McCollum et al. ........... 362/602 |

FOREIGN PATENT DOCUMENTS

| | | |
|---|---|---|
| EP | 2028410 A1 | 2/2009 |
| JP | 2001271447 A | 10/2001 |
| JP | 2011138731 A | 7/2011 |
| WO | 0032015 | 6/2000 |
| WO | 2006028703 A2 | 3/2006 |
| WO | 2006028703 A3 | 3/2006 |
| WO | 2008129467 A1 | 10/2008 |
| WO | 2009/040724 A3 | 4/2009 |
| WO | 2009129232 A1 | 10/2009 |
| WO | 2010147424 A2 | 12/2010 |
| WO | 2011004278 A1 | 1/2011 |
| WO | 2011030284 A1 | 3/2011 |
| WO | 2010147424 A3 | 4/2011 |

* cited by examiner

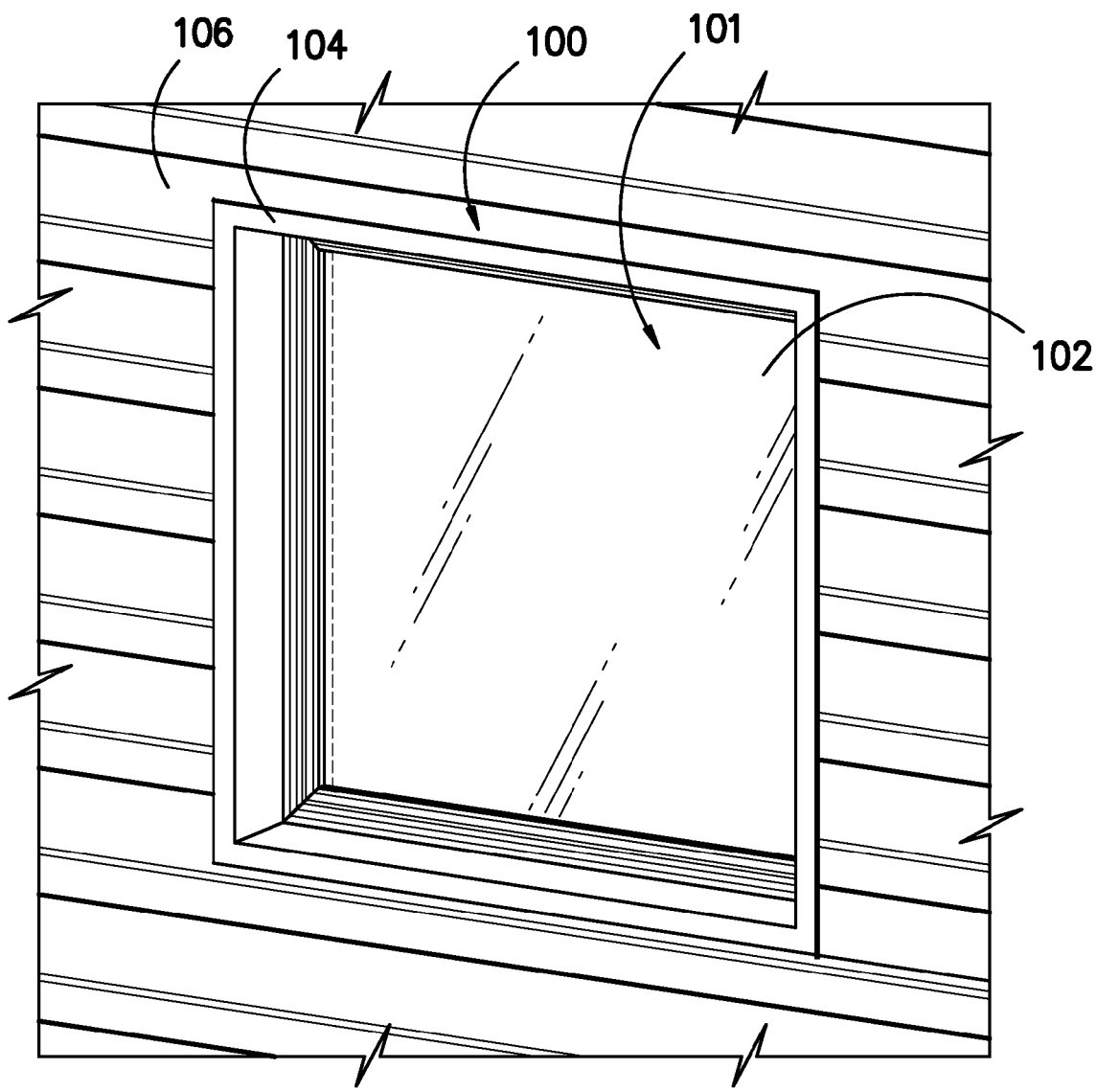
FIG. —1—

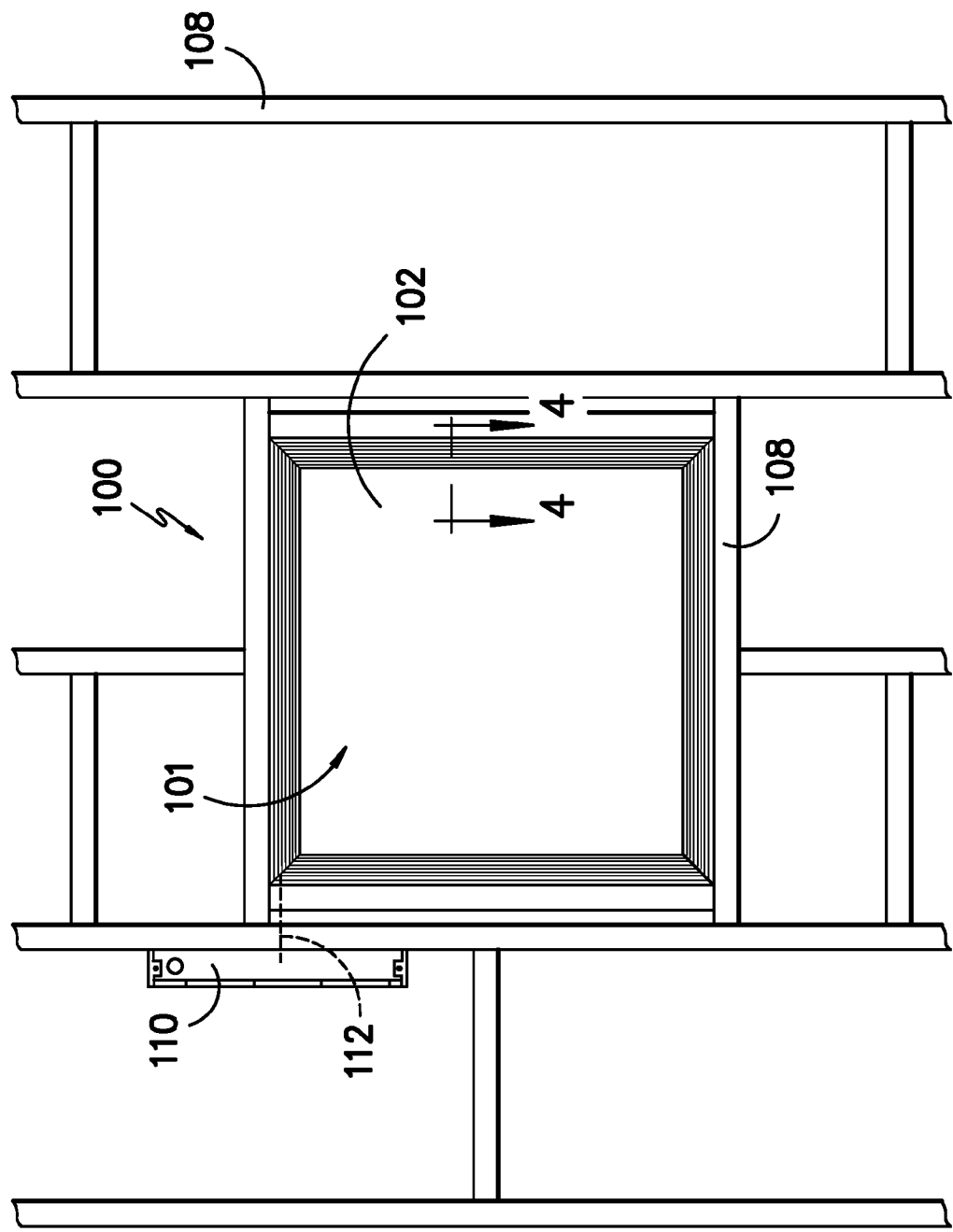
FIG. -2-

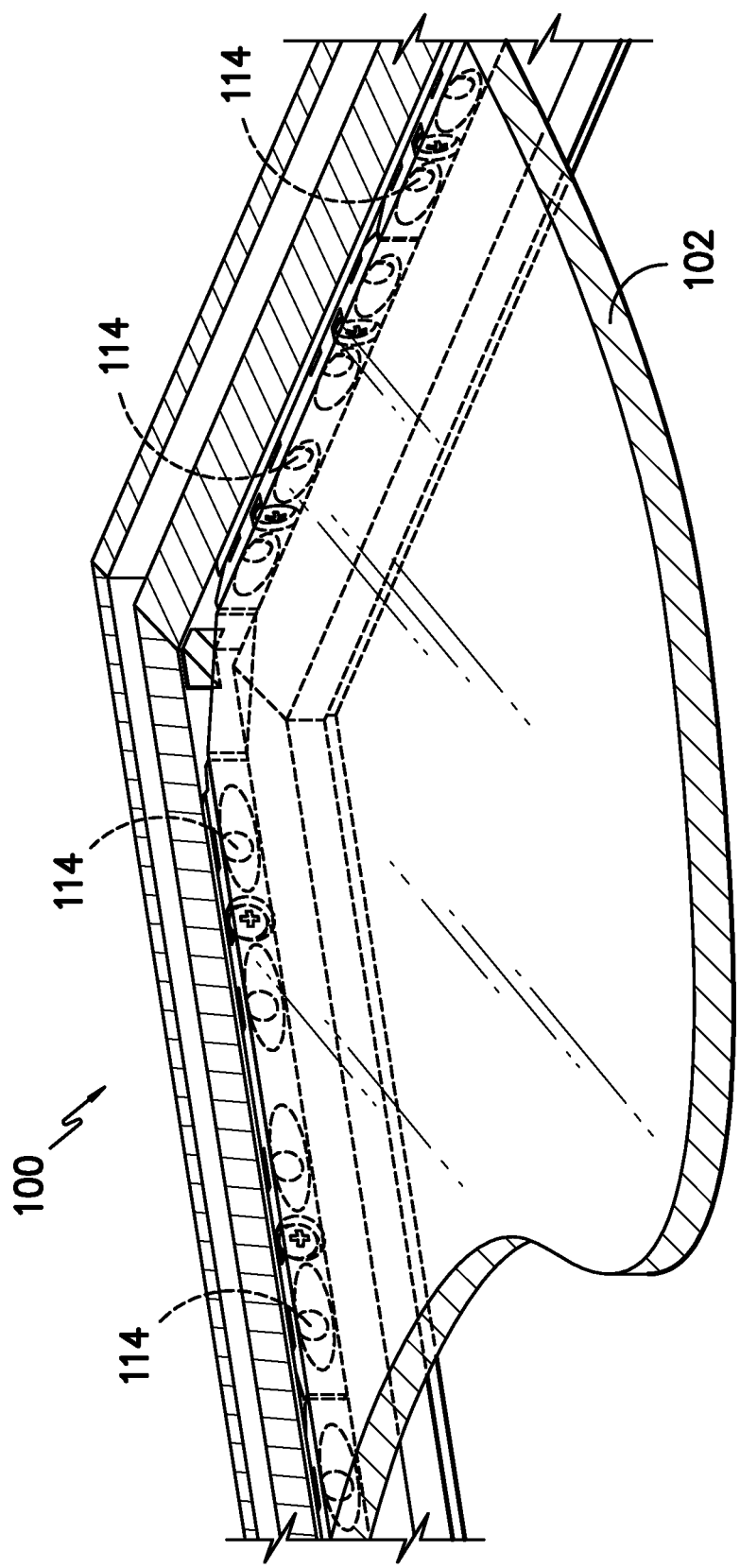
FIG. -3-

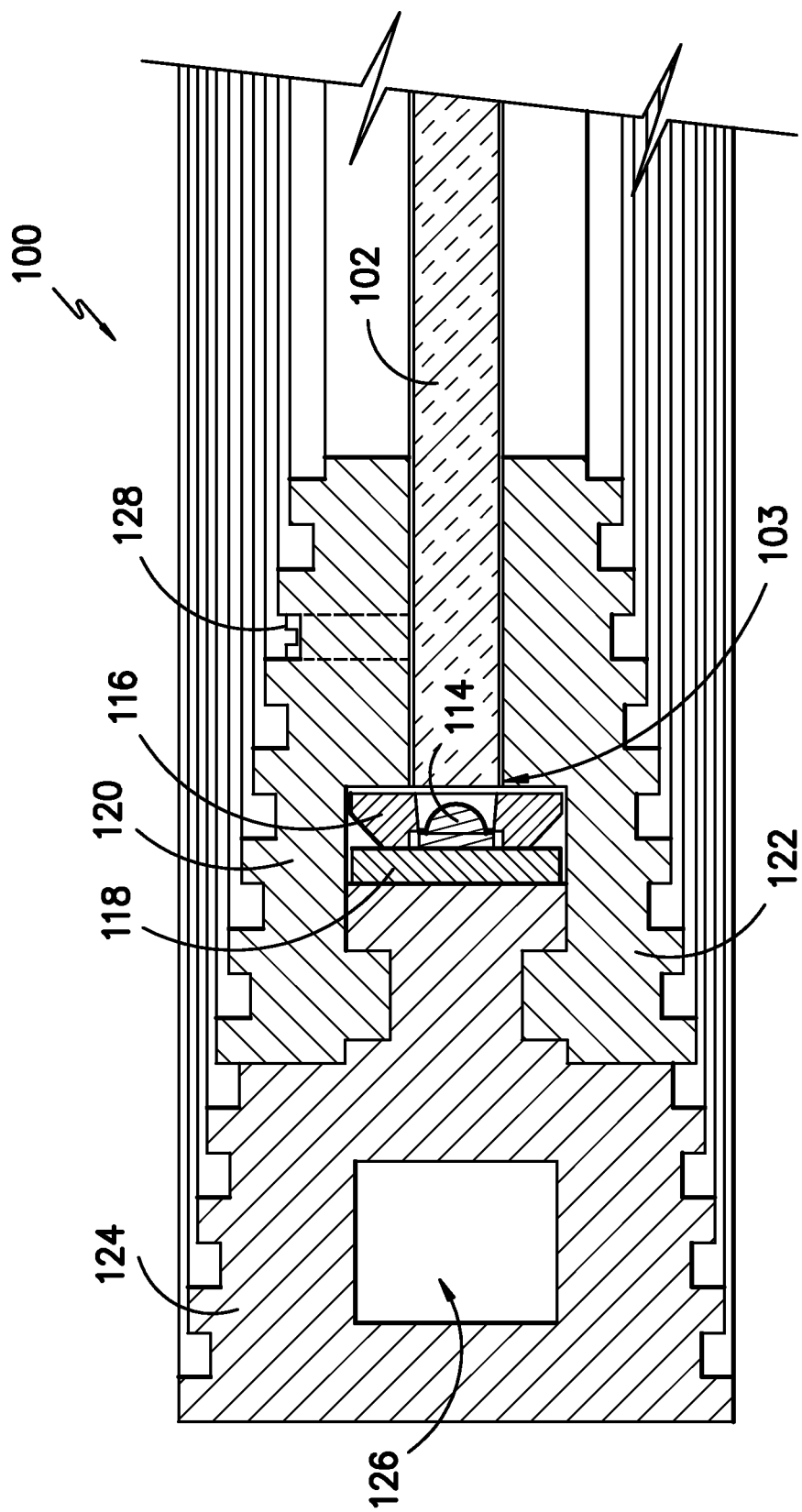
FIG. -4-

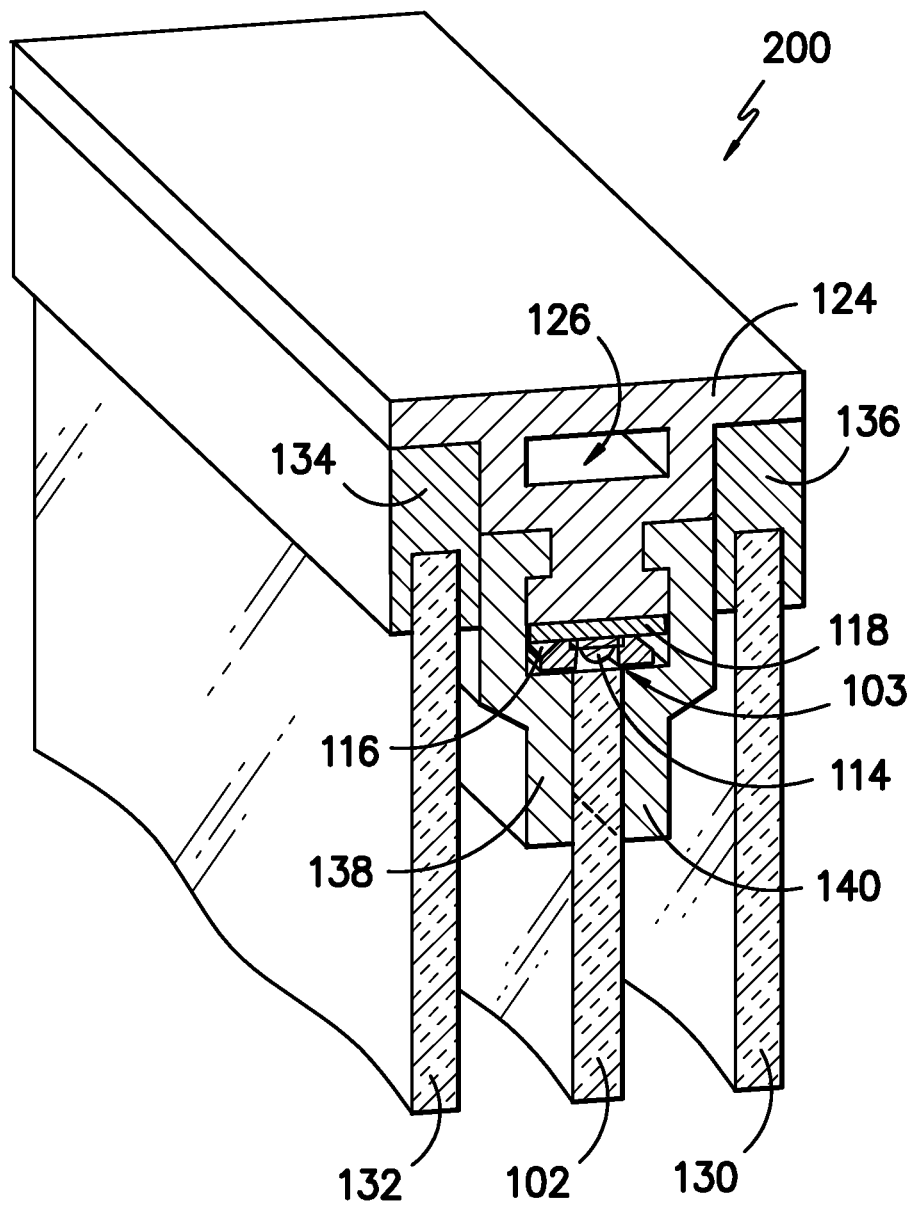
FIG. —5—

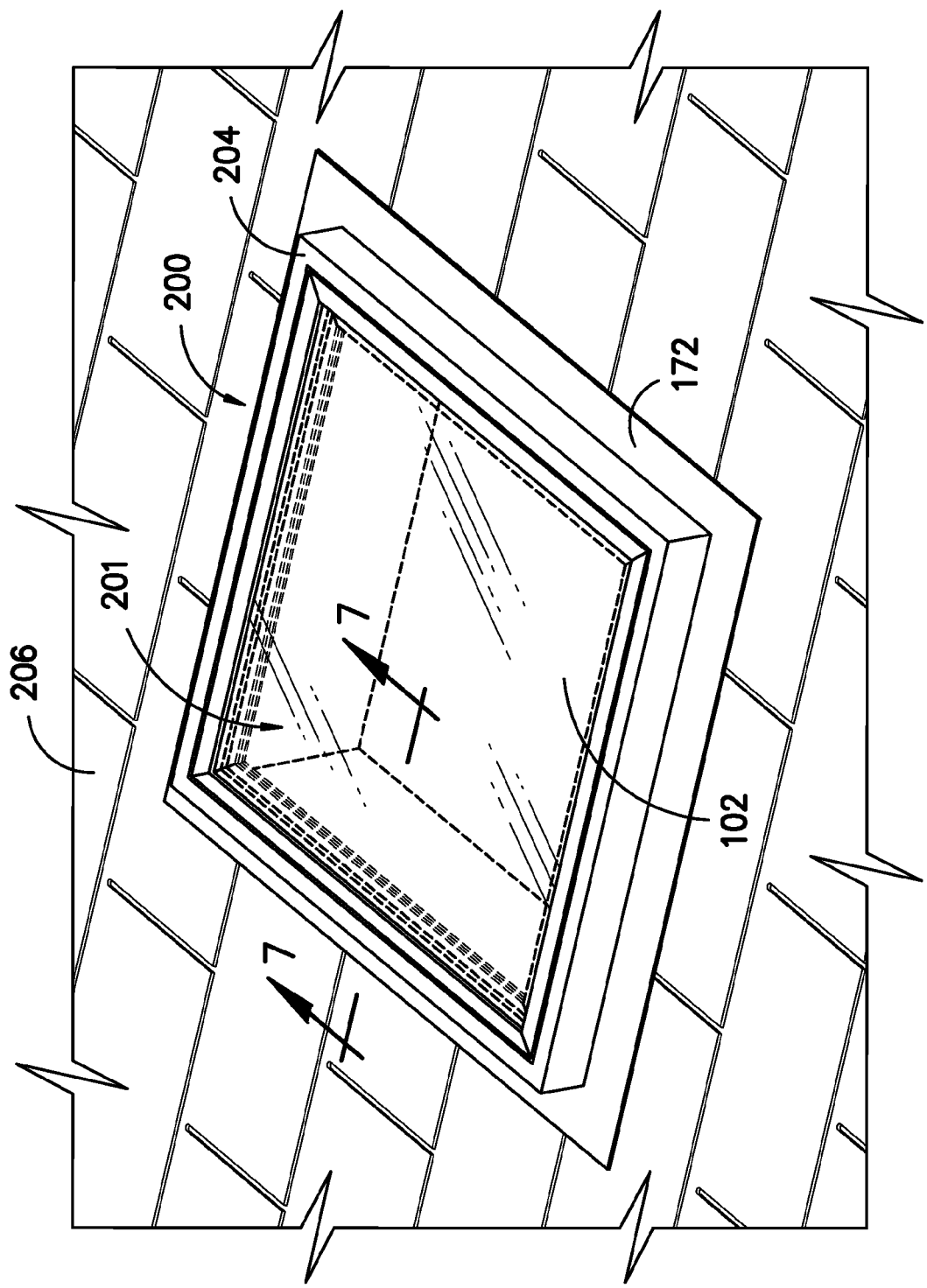
FIG. -6-

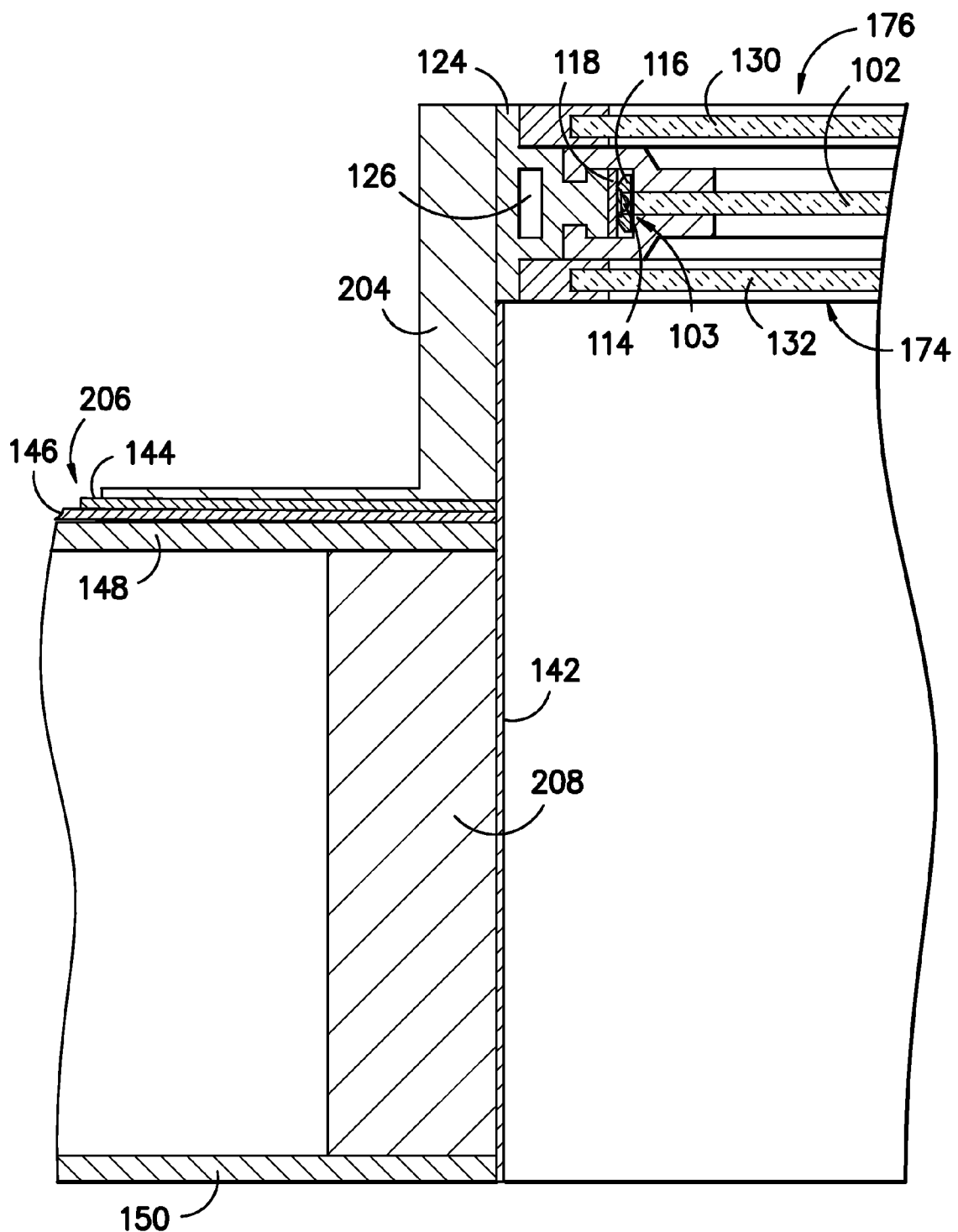
FIG. -7-

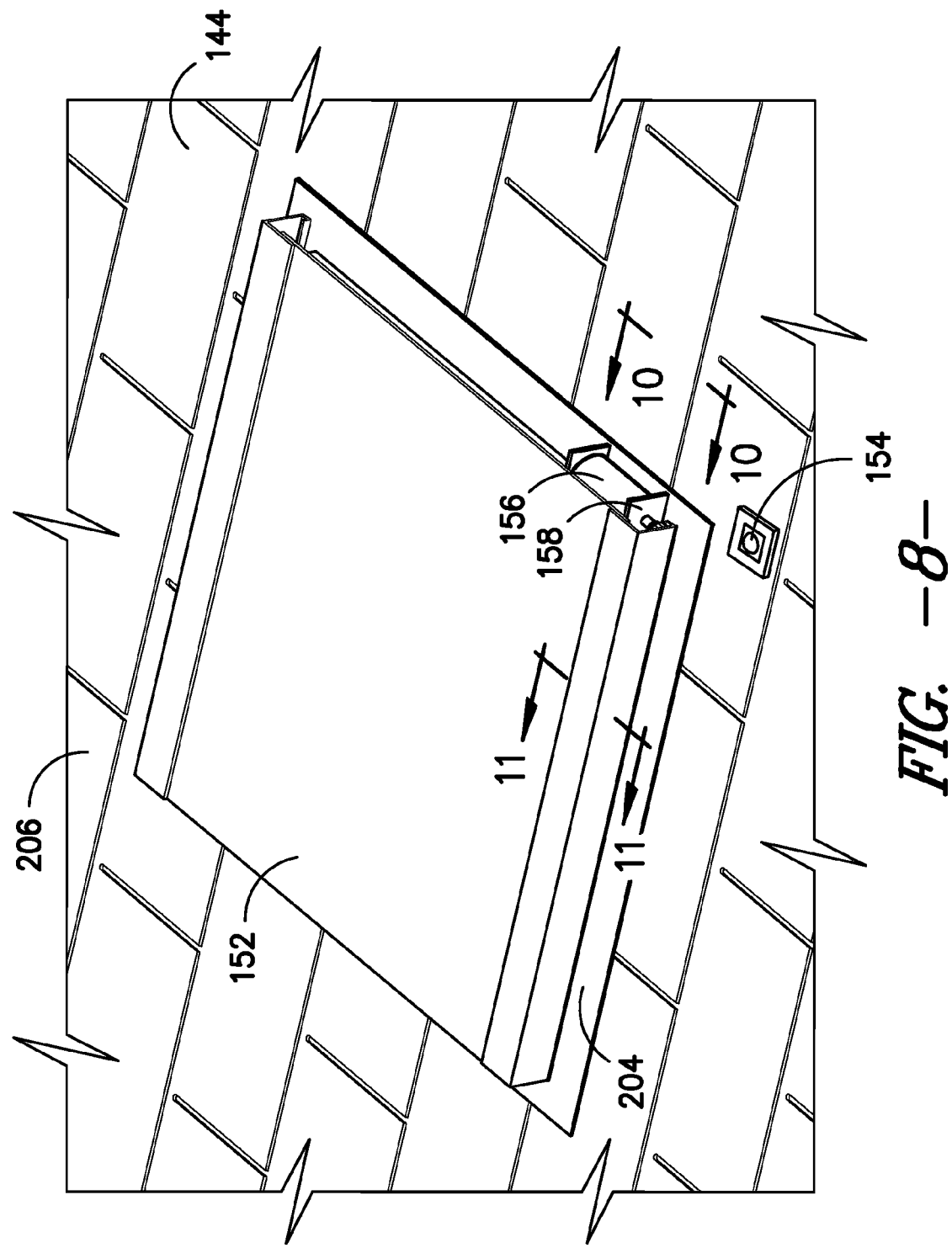
FIG. -8-

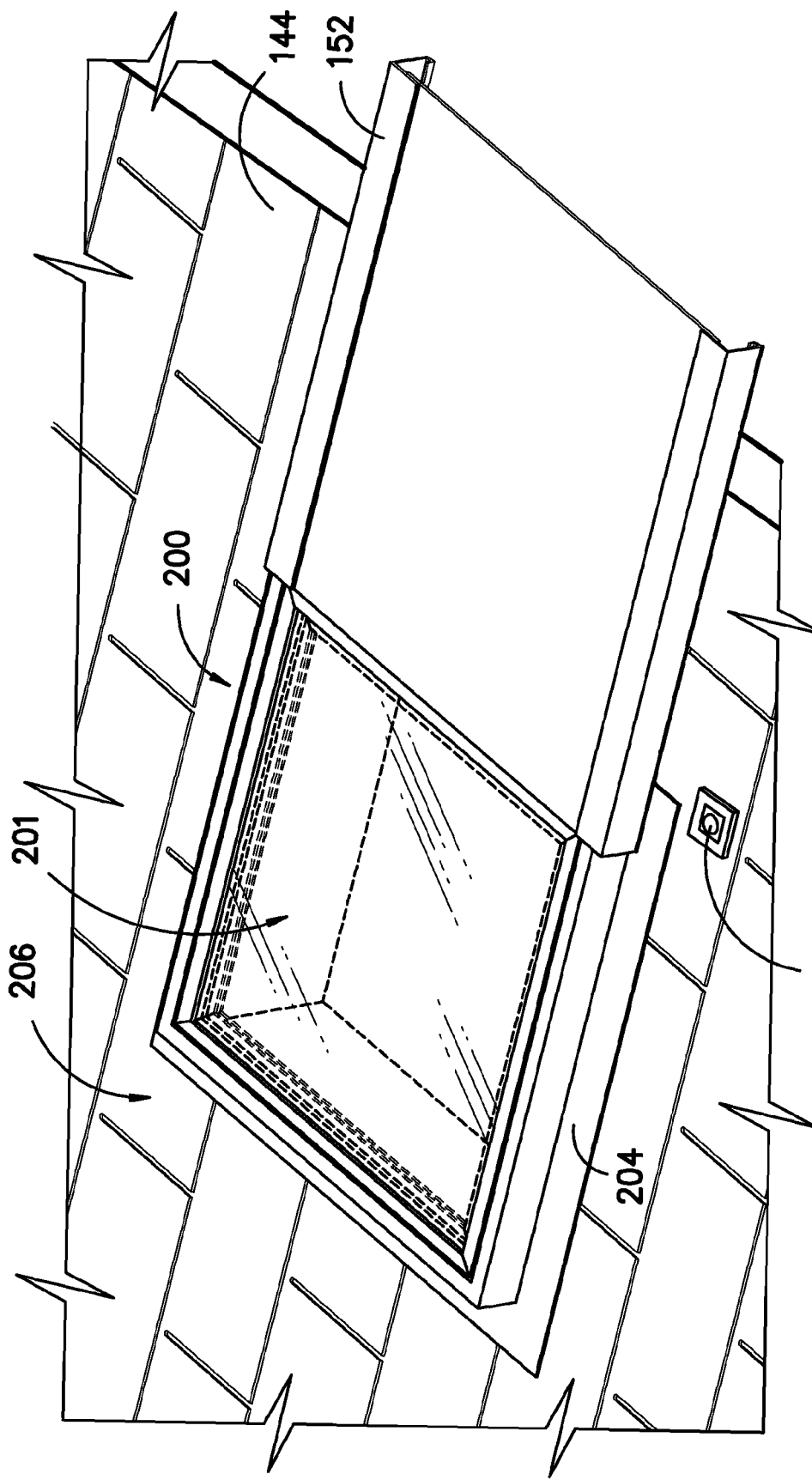
FIG. -9-

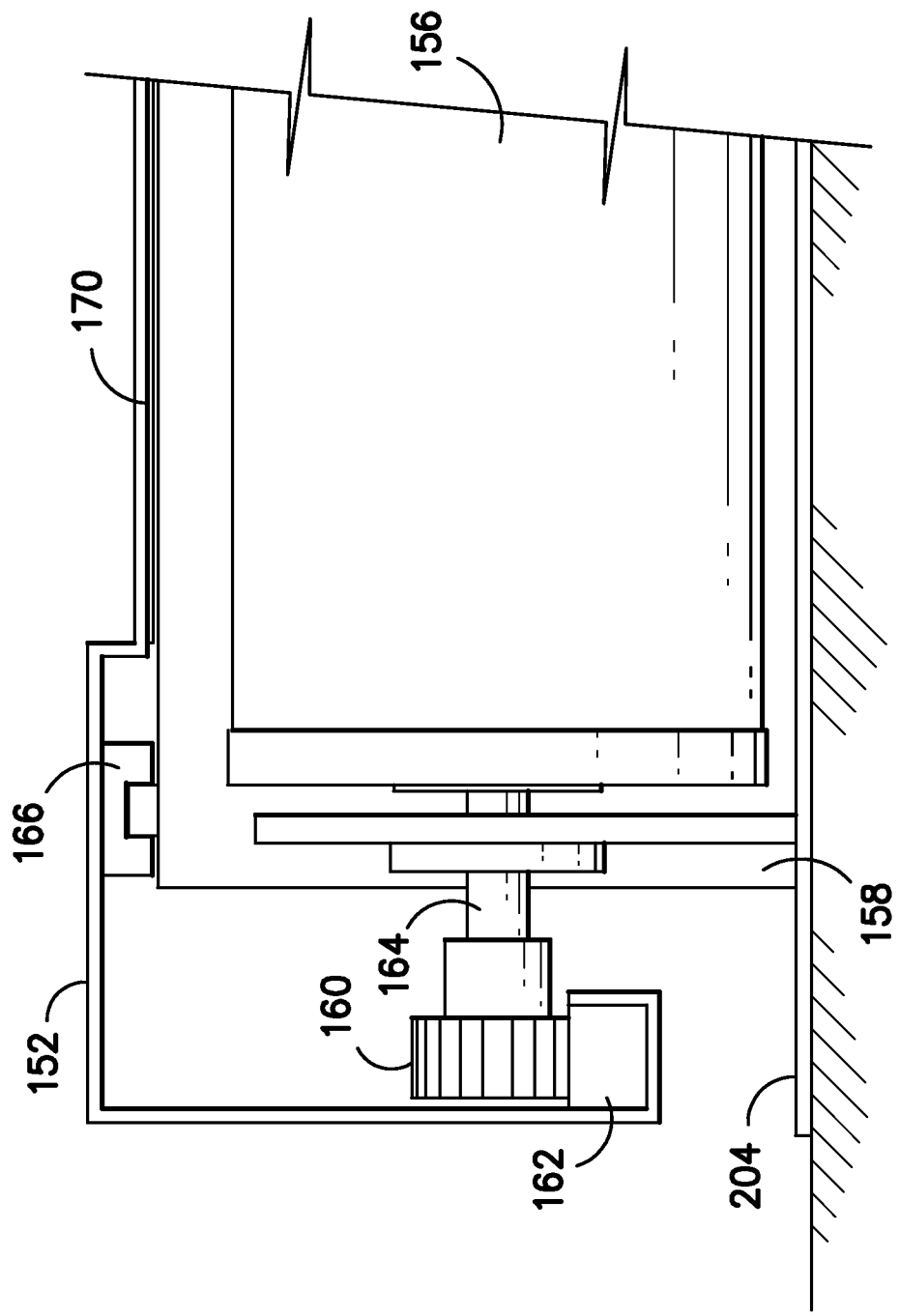
FIG. -10-

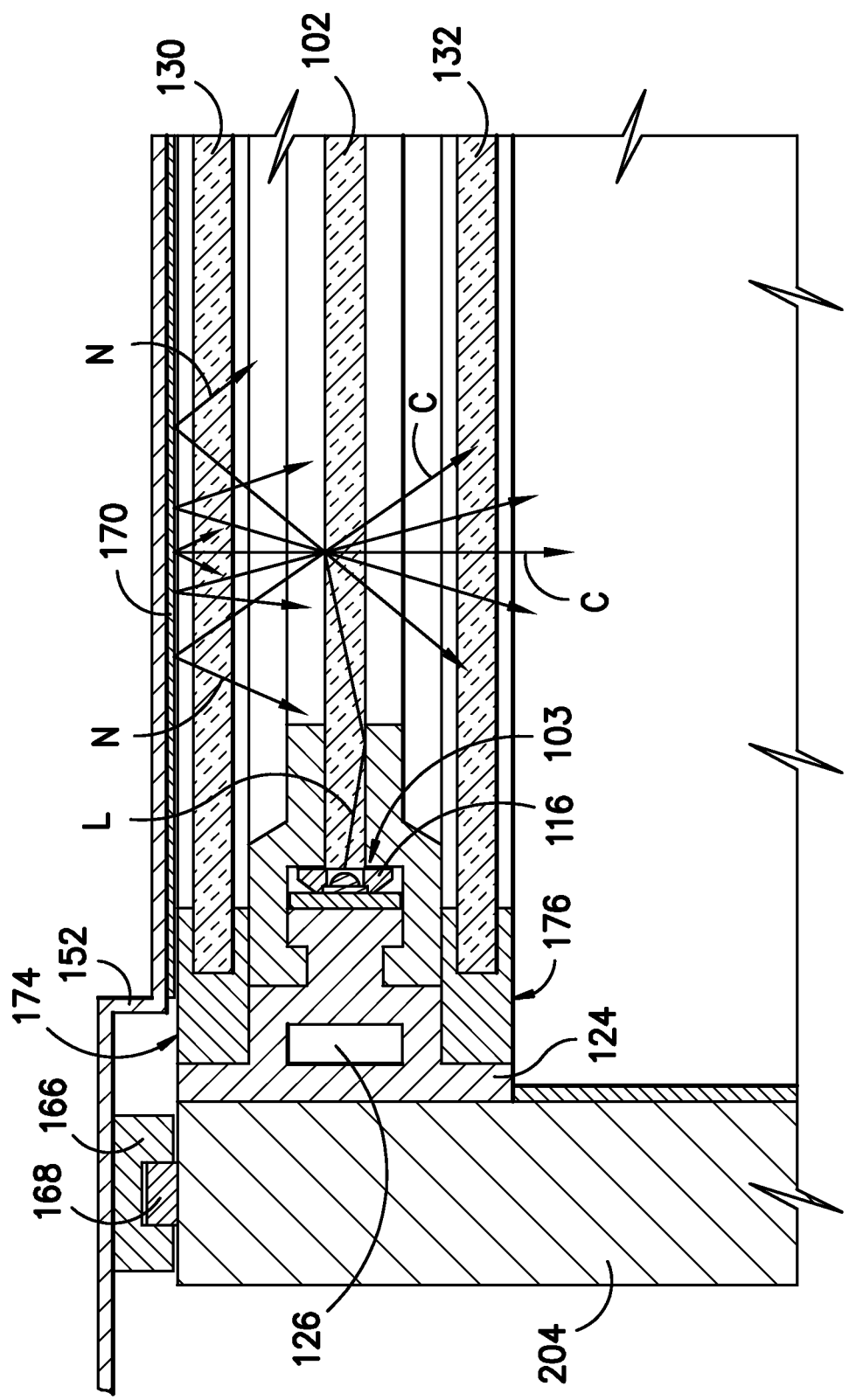
FIG. -11-

EDGE LIT LUMINAIRES FOR WINDOWS

FIELD OF THE INVENTION

The subject matter of the present disclosure relates generally to luminaires having a light guide configured as a window, with lighting along one or more edges of the light guide.

BACKGROUND OF THE INVENTION

Natural light is commonly used to provide illumination for the interior of buildings including commercial and residential structures. Windows positioned on exterior walls as well as roofs (commonly referred to as "skylights") can be used to provide for the passage of a substantial amount of natural light into a building. This natural light can reduce the amount of artificial illumination required and provide desirable aesthetic effects as well.

The amount of natural light available, however, is variable and depends upon e.g., the time of day and/or weather conditions. Additionally, where e.g., skylights are used, they consume space where e.g., a light fixture might otherwise be installed to provide illumination. When natural light is low or unavailable, the amount of light available under or near a skylight or even near windows along an exterior wall may be undesirably low—creating e.g., a dark spot in an interior room.

For a window functioning as a skylight, lights can be added to one or more walls near the skylight—typically along interior walls near the skylight. However, for some consumers, the addition of these lights may negatively impact aesthetics. Also, the positioning of these lights relative to the skylight may not allow for the same level of illumination as provided when natural light is available.

BRIEF DESCRIPTION OF THE INVENTION

To address the shortcomings discussed above and to provide other benefits as will be apparent from the description herein, exemplary embodiments of the present invention provide a luminaire configured as a window having a light guide with one or more light sources coupled to one or more edges of the light guide. Light emitted from the light guide can be used e.g., to supplement natural light passing through the window or to provide illumination when natural light is not available. Because the light source (or light sources) is incorporated into the window along one or more edges of the light guide, the light source can be either partially or totally concealed from view so as to create an appearance that can have aesthetic advantages. For example, exemplary embodiments of the present invention can have an appearance that is the same or similar to a conventional window/skylight. Other aspects and advantages of the invention will be set forth in part in the following description, or may be apparent from the description, or may be learned through practice of the invention.

BRIEF DESCRIPTION OF THE DRAWINGS

Reference is now made briefly to the accompanying drawings, in which:

FIG. 1 provides a perspective view of an exemplary embodiment of a luminaire of the present invention incorporated into an exterior wall of a building.

FIG. 2 is a perspective view of the exemplary embodiment of FIG. 1 with the covering of the exterior wall removed to illustrate an exemplary installation and elements inside the interior wall.

FIG. 3 is a partial cross-sectional view of a corner of the exemplary embodiment of FIG. 1.

FIG. 4 is a cross-sectional view of one side of the exemplary embodiment of FIGS. 1 and 2 taken along line 4-4 of FIG. 2.

FIG. 5 a cross-sectional view of one side of another exemplary embodiment of present invention—taken at a location similar to that of FIG. 4.

FIG. 6 is a perspective view of another exemplary embodiment of a luminaire of the present invention incorporated into a roof FIG. 7 is a cross-sectional view of one side of the exemplary embodiment of FIG. 6 taken along line 7-7 of FIG. 6.

FIG. 8 illustrates the exemplary embodiment of FIG. 6 with an exemplary reflector shown in a closed or reflecting position.

FIG. 9 illustrates the exemplary embodiment of FIG. 8 with the exemplary reflector shown in an open or non-reflecting position.

FIG. 10 is an end view of one side of the exemplary embodiment of FIG. 8 as viewed from the vantage point of line 10-10 in FIG. 8.

FIG. 11 illustrates a cross-sectional view of the exemplary embodiment of FIG. 8 as taken along line 11-11 with arrows used to indicate rays of light.

DETAILED DESCRIPTION OF THE INVENTION

Reference now will be made in detail to exemplary embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates an exemplary embodiment of a luminaire 100 of the present invention. For this exemplary embodiment, luminaire 100 is constructed as a window 101 installed in an exterior wall 106 of e.g., a building. By way of comparison, FIG. 6 illustrates another exemplary embodiment of a luminaire 200 of the present invention constructed as window or, more specifically, as a skylight 201 installed in a roof 206. Thus, using the teachings disclosed herein, it will be understood that a luminaire of the present invention can be constructed as a window located on an exterior wall of a structure separating the exterior from the interior of the structure; as a window positioned on the roof of a structure, sometimes referred to as a "skylight;" as well as a window located on an interior wall of a structure for separating interior spaces and/or to provide certain aesthetic effects.

Returning to FIG. 1 and also referring now to FIG. 2, luminaire 100 can be constructed with a casing 104 and supported within framing or other structural components 108 located within exterior wall 106. A protective, electrical box 110 is located adjacent to window luminaire 100. Box 110 can include e.g., one or more ballasts, controllers, wiring, and other electrical components used to power and control luminaire 100 and connected therewith by line 112. These components can be manufactured to meet one or more protocols such as e.g., the Digital Addressable Light Interface (DALI) standards. As used herein, "controller" or "processing device" may refer to one or more microprocessors or semiconductor devices and is not restricted necessarily to a single element. The processing device can be programmed to operate the luminaire according to the methods disclosed herein, for example, as well as methods known in the art. The processing device may include, or be associated with, one or memory elements such as e.g., electrically erasable, programmable read only memory (EEPROM).

Window 101 includes a light guide 102 constructed from a material through which light may pass substantially unobstructed, for example, from the exterior to the interior of the building that includes wall 106. The material used to form the light guide 102 may be a permanently transparent or translucent material. Alternatively, the material used to form the light guide 102 may configured to change its light path properties upon application or removal of an applied voltage. Window 101 and/or its associated light guide 102 can be configured in a variety of shapes including polygonal (e.g., square, rectangular, triangular), circular, and others. Similarly, window 101 and/or its associated light guide 102 may be planar or non-planar (e.g., slightly curved or bent). Window 101 could be fixed in position as shown in FIGS. 1 and 6, for example, or could be constructed as a sliding, hinged, or otherwise movable window whereby e.g., a user can open the window to e.g., allow for the passage of air.

FIG. 3 provides a partial cross-sectional view of a corner of the exemplary luminaire of FIGS. 1 and 2. A plurality of light sources 114 are positioned at the sides or edges 103 of light guide 102. Although shown in FIG. 3 with light sources 114 positioned along multiple edges of light guide 102, in other embodiments of the invention one or more light sources may be positioned along only a single edge, multiple edges, or all edges of the light guide depending upon e.g., the amount of lighting and/or other effects desired. As will be further discussed below, in exemplary embodiments, light sources 114 may be identical or may have different characteristics and/or be separately controlled to provide additional features. For the exemplary embodiment shown in FIG. 3, light sources 114 are hidden or concealed from view. As used herein, this means that the light sources 114 are positioned within luminaire 100 so that they are completely or substantially obscured by other elements of luminaire 100 (including e.g., the heat sink and/or light guide) when viewed by an observer who standing below or in front of window 101.

As shown more particularly in the cross-sectional view provided in FIG. 4 along one side of luminaire 100, each light source 114 is coupled to light guide 102 so as to provide or direct light into an edge 103 of light guide 102. A reflector 116, positioned in front of circuit board or substrate 118, assists in directing light towards light guide 102. A heat sink 124, preferably made of a heat conductor such as aluminum or other metal, helps to conduct heat away from light source 114. Heat sink 124 can include a channel or cavity 126 that can be used e.g., to route wiring between light sources 114 and a power source and/or controller. Heat sink 124 can also be used to connect luminaire 100 to casing 104 and/or frame components 108. In alternative embodiments of the present invention, the coupling of light sources 114 to light guide 102 can be accomplished by integrating light sources 114 directly into an edge 103 of light guide 102.

For this exemplary construction, light guide 102 is positioned between front plate 120 and rear plate 122 that provide an interference fit with heat sink 124. A set screw 128 helps hold light guide 102 in position. Using the teachings disclosed herein, it will be understood that other constructions for securing light guide 102 relative to light sources 114 may be used as well.

As used herein, a light guide (also referred to as e.g., a light emitting panel or wave guide) such as light guide 102 can be constructed from a solid transparent or translucent material such as a glass, plastic or other suitable transparent or translucent material that operates as a wave guide for light entering along edges 103 from light sources 114. Light guide 102 is provided with disruptions along at least one side of the guide that can be formed e.g., by cutting, molding, coating, forming, laser-etching or otherwise causing mechanical, chemical or other deformations in the exterior surface along at least one side.

When these disruptions are struck by light rays from light sources 114 that enter the panel from one or more edges 103, the disruptions cause some of the light rays to exceed the internal critical angle and exit from the light guide 102. The amount of light emitted from the light guide 102 will depend on e.g., the type, shape, depth and frequency of these disruptions. By way of example, if an exterior surface along one side of the light panel is mechanically deformed at decreasingly spaced intervals as the distance from the light sources 114 increases, a more uniform emission of light from the surface of light guide 102 will occur as viewed from a distance. Additionally, the disruptions may also be varied in depth and shape along the light guide 102 so as to produce a desired light output distribution.

Accordingly, luminaire 100 is installed into the exterior wall 106 so that the disruptions in light guide 102 direct light rays from light sources 114 into the interior of e.g., a building when light sources 114 are energized. As such, luminaire 100 can be used to supplement or replace the natural light that otherwise passes into the building through window 101. By way of example, during times when no natural light is available, light sources 114 can be activated to provide sufficient lighting into an interior space. During morning or evening, when natural light may not be sufficient, light sources 114 can be controlled e.g., manually or by e.g., a sensor and controller to vary the amount of light from light sources 114 as needed to provide a certain level of lighting to an interior space of a building. For example, light sources 114 could be controlled by e.g., a switch, photosensor, or other control device positioned in an interior room where window 101 is located. It should be understood that luminaire 100 could be installed on either an exterior or interior wall of a building to provide lighting as well as aesthetic features.

FIG. 5 is a cross-sectional view of one side of another exemplary embodiment of a luminaire 200 of the present invention—taken at a side location similar to that of FIG. 4. For this exemplary embodiment, glass panes 130 and 132 are positioned on opposing sides of light guide 102 and provide e.g., protection for light guide 102 as well an insulating effect where luminaire 100 is installed as a window on an exterior wall. Glass frames 134 and 136 help secure glass panes 132 and 130 in position. Cover plates 138 and 140 provide for securing light guide 102 to heat sink 124. By comparing the exemplary embodiments of e.g., FIGS. 4 and 5, it will be understood that light sources 114, which may be coupled with a circuit board 118, are partially or completely hidden from view. This allows luminaires 100 and 200 to appear as a conventional window while still providing illumination as described.

As stated above, FIG. 6 provides another exemplary embodiment where a luminaire 200 of the present invention is configured as a skylight 201 in a roof 206. Using the exemplary luminaire as described with regard to FIG. 5, luminaire 200 includes light guide 102 through which natural light may pass from the exterior to the interior of the building that includes roof 206. Accordingly, as with the embodiments of FIGS. 1, 2, 3, 4, 5, and 6, luminaire 200 can be used e.g., to supplement, or as a substitute for, natural light that passes through window 201 to the interior of the building.

Referring now to FIG. 6 and also to FIG. 7, which provides a cross-sectional view of one side of the exemplary embodiment of FIG. 6 as taken along line 7-7, a casing 204 is used to position luminaire 200 onto roof 206 and provide weather sealing. A flange 172 is secured onto shingles or other roofing materials 144 and 146 positioned on a wood sheathing 148 attached to beam 208. Sheetrock or other internal components provide for interior wall components 142 and 150. Other configurations for window 201 of luminaire 200 may be used as well so as to provide a skylight—it being understood that FIG. 7 is provided by way of example only. For instance, window 201 could be circular, include a dome shape, and/or be installed into roof 206 in a manner different than what is shown.

FIGS. 8 and 9 illustrate another exemplary embodiment in which luminaire 200 is provided with a reflector 152. In FIG. 8, a reflector 152 is in a first position where it is adjacent to (or over) window 201 and light guide 102. In FIG. 9, reflector 152 is in a second position that is non-adjacent to (or no longer over) window 201 and light guide 102 such that natural light may pass through from the exterior side 174 to the interior side 176.

Referring now to FIG. 10, the movement of reflector 152 between the first and second positions of FIGS. 8 and 9 is provided by a motor 156 connected to a pinion 160 through shaft 164. The rotation of pinion 160 by operation of motor 156 drives rack 162 so as to slide reflector 152 along guides 166 and 168 (FIG. 11). Accordingly, by controlling the direction of rotation of shaft 164, reflector 152 can be selectively moved between the first and second positions.

Referring again to FIG. 9, additionally, the operation of motor 156 can be directed using a controller in communication with a photosensor 154 positioned e.g., on roof 206 so as to detect natural light levels. For example, photosensor 154 can sense or measure the natural light level and output a first signal to the controller indicative of such natural light level. The controller can then compare this signal with a predetermined value for the light level. Depending upon whether the natural light level is under or over this predetermined value, the controller can operate motor 156 so as to move reflector 152 into the first or second position. In still other embodiments, a photovoltaic power source can be provided to power motor 156 using solar energy captured during daylight periods. As will be understood using the teachings disclosed herein, other control algorithms may be used as well.

FIG. 11 provides a cross-sectional view of the exemplary embodiment of FIGS. 9 and 10 when reflector 152 is positioned adjacent or over window 201. In this position, reflector 152 helps direct light from light source 114 towards the interior side 176 of luminaire 200. More specifically, as light rays L emitted from light sources 114 and/or reflected from reflector 116 are directed into the edge 103 of light guide 102, the light rays L travel within light guide 102 until a disruption preferably causes such to be reflected out of the light guide 102 as light rays C that travel towards the interior side 176. However, some light rays may be reflected towards reflector 152. In such case, a reflective coating or surface 170 on reflector 152 cause these light rays to be reflected back as light rays N towards and through light guide 102. As such, reflector 152 provides a mechanism for increasing the amount of light provided into the interior of the building particularly when e.g., natural light is low or unavailable. Reflector 152 can also be equipped with various features to enhance its aesthetic appeal. For example, reflector 152 could be configured to appear as a pair of traditional window shutters positioned on opposing sides of a window as viewed from the exterior of a building. Other aesthetic effects could be applied as well.

In addition to the features described above, a variety of additional features can be optionally provided with any of the exemplary embodiments described with reference to FIGS. 1, 2, 3, 4, 5, 6, 7, 8, 9, 10 and 11. For example, light source 114 can be operated by a controller that includes a timer. Based on the time of day, the controller can activate or deactivate light sources 114 so as to automatically provide illumination when natural light sources are low or unavailable. The controller could also be provided with a dimmer function so that e.g., the light provided by light sources 114 is gradually increased or decreased during e.g., morning or even hours. Optionally, the controller could also be configured to connect to a network, such as the Internet, by a wired or wireless connection to acquire or download weather information and output a second signal to increase or decrease the light provided by the light source depending upon this acquired or downloaded weather information, e.g., whether cloudy or sunny conditions are reported.

In one embodiment, the luminaire 100 or 200 includes at least one light source, a reflector, a motor coupled with the reflector, a photosensor, a controller coupled with the at least one light source, the motor and the photosensor. The photosensor is configured to sense a natural light level. The controller is configured to receive a signal output from the photosensor that is indicative of the natural light level sensed by said photosensor. The controller may also be configured to compare the natural light level with a predetermined light level (e.g., one selected by the manufacturer). Based on this comparison, the controller can generate an output to determine the position of the reflector.

As another example, the luminaire 100 or 200 includes a photosensor and a controller coupled with the photosensor. The photosensor is configured to sense a natural light level. The controller is configured to receive a signal indicative of the natural light level sensed by said photosensor, compare the natural light level with a predetermined light level; and output a signal to operate either said first light source or said second light source depending upon the natural light level sensed by said photosensor.

The type of lights used for light sources 114 can be e.g., LED, fluorescent, laser, incandescent, and/or others as well. In addition, light sources of different colors may also be used. For example, light sources 114 may be provided as multiple LEDS of varying colors depending upon the color or other effects desired.

Light sources 114 can be divided into different groups that are controlled separately depending upon the lighting effect desired. For example, lights sources 114 could be divided into first group of light sources having a certain color or color temperature and a second group of light sources having a different color or color temperature. A controller could be connected with a photosensor that measures the light level available from e.g., natural light on the exterior of a building. The controller can compare the light level as measured by the photosensor and then provide an output to operate either the first light source or the second light source depending upon the amount of light measured by the photosensor. Optionally, a switch could be provided whereby a user manually selects the first light source or second light source.

By way of additional example, the first light source might have a first correlated color temperature (CCT) in the range of about 5500 K to about 6500 K to resemble daylight, and the second light source might have a second CCT that is lower than the first color temperature of the first light source to provide a warmer light to the interior. Other variations and configurations in the light sources may be applied as well.

By way of additional example, embodiments of the luminaires 100, 200 and/or reflector 152, motor 156, etc. may be installed in or on a roof and/or a wall of a vehicle or a structure. Non-limiting examples of a vehicle include recreational vehicles, train cars, aircraft, spacecraft, surface marine vessels, and sub-surface marine vessels, etc. Non-limiting examples of a structure include a shipping container, a mobile home, a manufactured home, and the like.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A luminaire, comprising:
a light guide, the light guide having at least one edge;
a window comprising said light guide;
at least one light source coupled to the edge of said light guide, the light source connected to a substrate and configured for providing light into said light guide; and
a reflector positioned in front of the substrate and adjacent the light source, the reflector configured to direct light from the light source towards the edge of the light guide.

2. A luminaire as in claim 1, further comprising a heat sink coupled with said light source to conduct heat energy away from said light source.

3. A luminaire as in claim 1, further comprising:
a photosensor configured to sense natural light level; and,
at least one controller configured to
receive a signal regarding the natural light level sensed by said photosensor;
compare the natural light level with a predetermined light level; and
output a first signal to increase or decrease the light provided by said light source depending upon the natural light level sensed by said photosensor.

4. A luminaire as in claim 1, further comprising a timer from which light outputted by said light source can be adjusted based on the time of the day.

5. A luminaire as in claim 1, further comprising:
at least one controller configured to connect to a network to acquire weather information from the network; output a second signal to increase or decrease the light provided by said light source depending upon the acquired weather information.

6. A luminaire as in claim 1, the luminaire having an exterior side and an interior side, the luminaire further comprising:
a planar reflector positioned on the exterior side of the luminaire and configured for covering the window;
a motor coupled with said reflector, said motor configured to move said planar reflector between i) a first position that is adjacent to said light guide for reflecting light from said light source towards the interior side of the luminaire, and ii) a second position that is non-adjacent to said light guide to permit light from the exterior side to enter through the window.

7. A luminaire as in claim 6, further comprising a timer from which the position of said reflector can be determined based on the time of the day.

8. A luminaire as in claim 6, further comprising:
a photosensor configured to sense a natural light level; and,
at least one controller configured to
receive a signal indicative of the natural light level sensed by said photosensor;
compare the natural light level with a predetermined light level; and
generate an output to determine the position of the planar reflector depending upon the natural light level sensed by said photosensor.

9. A luminaire as in claim 6, further comprising a photovoltaic power source for providing energy to operate said motor, said light source, or both.

10. A luminaire as in claim 1, wherein said at least one light source comprises:
a first light source having a first correlated color temperature in a range of 5500 K to 6500 K; and
a second light source having a second correlated color temperature lower than the first color temperature of said first light source.

11. A luminaire as in claim 10, further comprising:
a photosensor configured to sense a natural light level; and,
at least one controller configured for
receiving a signal regarding the natural light level sensed by said photosensor;
comparing the natural light level with a predetermined light level; and
outputting a signal to operate either said first light source or said second light source depending upon the natural light level sensed by said photosensor.

12. A luminaire as in claim 1, wherein said at least one light source comprises a plurality of discrete light sources with at least one of the discrete light sources having a color different from the other light sources.

13. A luminaire as in claim 1, wherein said at least one light source comprises a plurality of discrete light sources with at least one of the discrete light sources having a correlated color temperature different from the other light sources.

14. A luminaire as in claim 1, wherein said window comprises a frame in which said at least one light source is concealed from view.

15. A luminaire as in claim 1, wherein said window is positioned on a roof or exterior wall of a structure.

16. A luminaire as in claim 1, wherein said window comprises a material through which light can pass.

17. A luminaire, comprising:
a light guide, the light guide defining a plurality of edges forming a periphery of said light guide;
a window comprising said light guide;
a plurality of light sources, said light sources coupled with said plurality of edges of said light guide and connected to a plurality of substrates; and
a plurality of reflectors, wherein each reflector is positioned in front of a substrate and adjacent a light source, and wherein each of the reflectors is configured to direct light from the light source towards one of the plurality of edges forming the periphery of the light guide.

* * * * *